United States Patent
Lacaze et al.

(10) Patent No.: US 12,196,864 B1
(45) Date of Patent: Jan. 14, 2025

(54) DETECTION AND RANGING SENSOR STABILIZATION SYSTEMS AND METHODS

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US); Kyle Smith, Gaithersburg, MD (US); Tanner Ray, Germantown, MD (US); William Becker, Monrovia, MD (US); John R. Howard, Gaithersburg, MD (US); John Keyser, Sykesville, MD (US); Raymond Wilhelm, Gaithersburg, MD (US); Matthew Newcomer, Middletown, VA (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 196 days.

(21) Appl. No.: 17/871,411

(22) Filed: Jul. 22, 2022

Related U.S. Application Data

(60) Provisional application No. 63/224,686, filed on Jul. 22, 2021.

(51) Int. Cl.
  *G01S 17/931*   (2020.01)
  *B60W 40/10*   (2012.01)
  (Continued)

(52) U.S. Cl.
  CPC ........... *G01S 17/931* (2020.01); *B60W 40/10* (2013.01); *B60W 60/001* (2020.02);
  (Continued)

(58) Field of Classification Search
  CPC ...... G01S 17/931; G01S 7/4813; G01S 7/497; G01K 3/005; B60W 40/10; B60W 60/001; B60W 2420/408; G01C 21/1652
  See application file for complete search history.

(56) References Cited

U.S. PATENT DOCUMENTS

| | | | | |
|---|---|---|---|---|
| 5,455,116 A | * | 10/1995 | Nagano | H05K 9/0086 428/545 |
| 10,955,530 B2 | | 3/2021 | Pei et al. | |

(Continued)

FOREIGN PATENT DOCUMENTS

| | | | | |
|---|---|---|---|---|
| CN | 104269586 A | * | 1/2015 | |
| EP | 1308747 A2 | * | 5/2003 | G01S 7/4813 |
| EP | 3579022 B1 | * | 4/2022 | G01S 17/931 |

OTHER PUBLICATIONS

Optical Filters LTD, "EMI Mesh", 2009 (Year: 2009).*

(Continued)

*Primary Examiner* — Hussein Elchanti
*Assistant Examiner* — Kenneth M Dunne
(74) *Attorney, Agent, or Firm* — RowanTree Law Group, PLLC; Carson C. K. Fincham

(57) ABSTRACT

A system can have an electromagnetic radiation (EMR) detection and ranging (DAR) device, such as a LIDAR device. A shock mount can couple the EMR DAR device to a vehicle. The shock mount can isolate the EMR DAR device from impulse shocks experienced by the vehicle. An inertial measurement unit (IMU) can be coupled to the EMR DAR device or a first portion of the shock mount. The IMU can measure movement of the EMR DAR device. Alternatively or additionally, the EMR DAR can detect locations of a reference feature of the vehicle at different times and can use the detected locations to determine movement of the EMR DAR relative to the vehicle. Data of the EMR DAR device indicative of detected features can be adjusted based at least in part on the movement measured by the IMU.

14 Claims, 8 Drawing Sheets

(51) Int. Cl.
*B60W 60/00* (2020.01)
*G01C 21/16* (2006.01)
*G01K 3/00* (2006.01)
*G01S 7/481* (2006.01)
*G01S 7/497* (2006.01)

(52) U.S. Cl.
CPC ......... *G01C 21/1652* (2020.08); *G01K 3/005* (2013.01); *G01S 7/4813* (2013.01); *G01S 7/497* (2013.01); *B60W 2420/408* (2024.01); *G01S 2007/4977* (2013.01)

(56) References Cited

U.S. PATENT DOCUMENTS

| | | | |
|---|---|---|---|
| 2013/0120736 A1* | 5/2013 | Bosse | G01S 17/89 |
| | | | 250/336.1 |
| 2019/0137259 A1* | 5/2019 | Mori | G01B 11/26 |
| 2020/0081102 A1 | 3/2020 | Lacaze et al. | |
| 2021/0109205 A1* | 4/2021 | Liao | G06T 19/20 |
| 2022/0185299 A1* | 6/2022 | Ye | G06V 20/58 |
| 2022/0390612 A1* | 12/2022 | Wang | G01S 7/497 |
| 2024/0123709 A1* | 4/2024 | Yavari | B32B 17/10761 |

OTHER PUBLICATIONS

Kumar et al, "Techniques and Concepts to Mitigate and Neutralize Electro-Magnetic Weapons Attacks", 2015, IEEE (Year: 2015).*
Machine Translation of CN-104269586-A (Year: 2015).*
Machine translation of EP-1308747-A2 (Year: 2003).*

* cited by examiner

DETECTION AND RANGING SENSOR STABILIZATION SYSTEMS AND METHODS

CROSS-REFERENCE TO RELATED APPLICATION(S)

This application claims benefit of and priority under 35 U.S.C. § 119 (c) to and is a non-provisional of U.S. Provisional Patent Application No. 63/224,686 filed on Jul. 22, 2021 and entitled "Detection and Ranging Sensor Stabilization Systems and Methods," which is hereby incorporated by reference herein in its entirety.

FIELD

The present disclosure relates generally to sensor stabilization, and more particularly, to stabilization of detection and ranging sensor systems, for example, electromagnetic radiation (EMR) detection and ranging (DAR) sensor systems, such as light detection and ranging (LIDAR) devices and/or radio detection and ranging (RADAR) devices.

BACKGROUND

Light detection and ranging (LIDAR, sometimes referred to as LADAR for laser detection and ranging) and radio detection and ranging (RADAR or radar) are active sensing technologies that can provide autonomous vehicles with information about their surroundings. To improve or maximize visibility, these sensors are often located outside the cabin of a vehicle. As such, the sensors can be exposed to a wide variety of environmental conditions, such as precipitation (e.g., rain, snow, hail, etc.), debris (e.g., dust), temperature variations (e.g., hot, cold), shock, vibration, etc. In addition to the environmental conditions that apply to all autonomous vehicles, military applications require these sensors to be able to withstand more extreme conditions, such as but not limited to impulse shock and blast overpressure from gunfire or explosions, extreme thermal conditions, and electromagnetic effects.

Although existing LIDAR sensors may meet water-sealing, dust-sealing, and thermal exposure criteria applicable to the consumer or commercial market, such sensors are generally insufficient for the more extreme conditions encountered in military applications. For example, next generation sensors have been advertised to meet shock and vibration standards, such as International Standard IEC 60068 February 27, published Feb. 27, 2008, and Society of Automotive Engineers (SAE) standard J1211_201211, published Nov. 19, 2012. However, the requirements of these standard may be insufficient to survive impulse shock and blast overpressure in battlefield environments; nor do these standards address vibration profiles typically seen by tracked vehicles. Failure of a LIDAR sensor in a combat-ready autonomous military vehicle may pose a serious risk to people, animals, vehicles, and/or property.

Embodiments of the disclosed subject matter may address one or more of the above-noted problems and disadvantages, among other things.

SUMMARY

Embodiments of the disclosed subject matter provide electromagnetic radiation (EMR) detection and ranging (DAR) sensor systems, such as light detection and ranging (LIDAR) devices, that have been ruggedized and/or stabilized for use with partially or fully autonomous vehicles operating in harsh environments. In some embodiments, the EMR DAR system can be coupled to the vehicle via a shock mount, which may make the EMR DAR system more susceptible to detection errors (e.g., with respect to locating features in the environment) due to relative motion between the EMR DAR system and the vehicle. In some embodiments, data from the EMR DAR system can be adjusted to account for the relative motion. Alternatively or additionally, the EMR DAR system can be protected from environmental conditions (e.g., solar radiation, weather, etc.) or disturbances (e.g., electromagnetic interference, blasts, etc.). In some embodiments, operation of the EMR DAR system can be maintained, for example, by automated cleaning of a sensing interface (e.g., sensor window) of the EMR DAR system.

In one or more embodiments, a system can comprise an EMR DAR device, a shock mount, one or more first inertial measurement units (IMUs), and a controller. The EMR DAR device can comprise a source and a detector. The source can be configured to generate EMR having one or more wavelengths, and the detector can be configured to detect EMR having the one or more wavelengths reflected from one or more features in a surrounding environment. The shock mount can be constructed to couple the EMR DAR device to a vehicle and to isolate the EMR DAR device from impulse shocks experienced by the vehicle. The one or more first IMUs can be coupled to the EMR DAR device or a first portion of the shock mount, and the one or more first IMUs can be configured to measure movement of the EMR DAR device. The controller can be operatively coupled to the EMR DAR device and the one or more first IMUs. The controller can comprise one or more processors and computer readable storage media storing computer-readable instructions that, when executed by the one or more processors, cause the controller to adjust data of the EMR DAR device indicative of the detected one or more features in the surrounding environment based at least in part on the movement measured by the one or more first IMUs.

In one or more embodiments, a system can comprise an EMR DAR device and a controller. The EMR DAR device can comprise a source and a detector. The source can be configured to generate EMR having one or more wavelengths, and the detector can be configured to detect EMR having the one or more wavelengths reflected from one or more features in a surrounding environment. The EMR DAR device can be mounted on a vehicle. The controller can be operatively coupled to the EMR DAR device. The controller can comprise one or more processors and computer readable storage media storing computer-readable instructions that, when executed by the one or more processors, cause the controller to determine, based on one or more first signals from the EMR DAR device at a first time, a first location of a reference feature of the vehicle, and to determine, based on one or more second signals from the EMR DAR device at a second time, a second location of the reference feature of the vehicle. In addition, the computer-readable instructions, when executed by the one or more processors, can cause the controller to further calculate movement of the EMR DAR device relative to the vehicle based at least in part on the determined first and second locations, and to adjust data of the EMR DAR device indicative of the detected one or more features in the surrounding environment based at least in part on the calculated movement.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. Throughout the figures, like reference numerals denote like elements. An understanding of embodiments described herein and many of the attendant advantages thereof may be readily obtained by reference to the following detailed description when considered with the accompanying drawings, wherein.

DETAILED DESCRIPTION

I. Introduction

Disclosed herein are systems and methods for ruggedizing and/or stabilizing electromagnetic radiation (EMR) detection and ranging (DAR) sensor systems, such as light detection and ranging (LIDAR) sensors (e.g., Velodyne Lidar Alpha Prime sensor, sold by Velodyne Lidar, San Jose, California). In some embodiments, a vehicle can have one or more LIDAR sensors coupled to (e.g., directly or indirectly, for example, via one or more intervening members) and/or mounted on one or more external surfaces of a vehicle. In some embodiments, the vehicle can be a partially autonomous vehicle (e.g., where a human operator can periodically take control, for example, to drive in traffic or at low speeds) or fully autonomous vehicle (e.g., where no human operator is available, or a human operator only takes control in the event of an emergency or system failure). For example, the vehicle can be a military vehicle or another vehicle subject to harsh environments.

Figure 1:
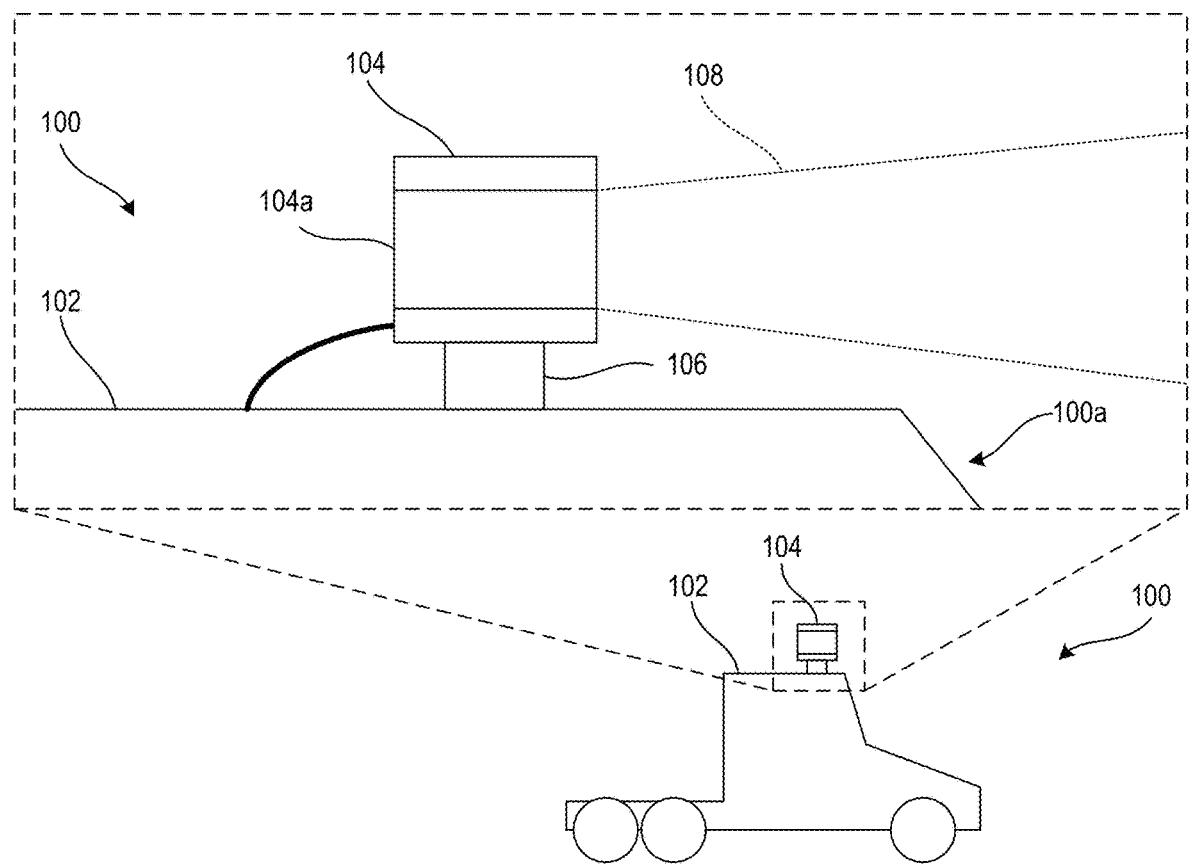
FIG. 1 is a simplified schematic diagram of an autonomous vehicle with a light detection and ranging (LIDAR) sensor system, according to one or more embodiments of the disclosed subject matter.

For example, FIG. 1 illustrates a vehicle 100 with a LIDAR sensor 104 mounted on a roof 102 of vehicle 100 via support member 106. In some embodiments, the LIDAR sensor 104 can have an externally-facing sensing interface 104*a* (e.g., a window transparent to light employed by the LIDAR sensor 104). Other mount locations (e.g., hood, trailer, side, etc.) are also possible according to one or more contemplated embodiments. In some embodiments, the LIDAR sensor 104 can have a detection field-of-view 108 that extends outward from sensor 104 and/or vehicle 100. In the illustrated example, at least a portion of the detection field-of-view 108 may be directed toward a front 100*a* of the vehicle 100. Alternatively or additionally, in some embodiments, field-of-view 108 may extend outward 180° or more (e.g., to allow detection of features in front and to the sides of the vehicle), 270° or more (e.g., to allow detection of features in front of, to the sides of, and to the rear of the vehicle), or even 360°.

In some embodiments, the LIDAR system can be adapted to endure and reliably operate when exposed to water, dust, electromagnetic (EM) radiation (e.g., EM interference (EMI)), environmental extremes (e.g., temperatures greater than 35° C. or less than 0° C.), impulse shock, and/or blast overpressure, among other things that may be encountered when operating on a military vehicle or in other harsh environments. In some embodiments, the LIDAR system can include one or more modules, components, or stages that compensate an output of the sensor for such exposure (e.g., relative motion induced by an impulse or blast), that controls sensor power to comply with military or other industry standards, and/or that cleans or maintains a sensor interface for reliable operation.

Although the discussion herein is directed to LIDAR devices, embodiments of the disclosed subject matter are not limited thereto. Rather, the teachings of the present disclosure can apply to other types of sensor systems that require ruggedization and/or stabilization, such as but not limited to radio detection and ranging (RADAR) sensors, for example, to operate reliably and/or more accurately in military or other harsh environments.

II. Water and Dust Sealing

In some embodiments, the LIDAR device can include a housing or enclosure that is sealed with respect to water, dust (e.g., particulate), or both. For example, the LIDAR sensor housing or enclosure can meet at least the sealing requirements of Ingress Protection (IP) 69K (e.g., as set forth in International Standard ISO 20653:2013, entitled "Road vehicles—Degrees of protection (IP code)—Protection of electrical equipment against foreign objects, water and access," published Feb. 15, 2013, incorporated by reference herein), which is published by the International Electrotechnical Commission (IEC) and incorporated by reference herein. For example, IP69K requires a system to operate as intended while high-pressure, high-temperature water jets attempt to penetrate the system (see IEC 60529:2019, entitled "Degrees of protection provided by enclosures (IP code)," published Aug. 29, 2013, incorporated by reference herein). Items that meet requirements for IP69K may also meet requirements for IP68, for example, the capability to withstand submersion in water to a depth greater than 1 meter for at least 30 minutes.

III. Electromagnetic Effects

In some embodiments, the LIDAR sensor, or a housing or enclosure thereof, can meet (or be modified to meet) at least the electromagnetic compatibility (EMC) requirements of MIL-STD-461G (entitled "Interface Standard: Requirements for the Control of Electromagnetic Interference Characteristics of Subsystems and Equipment," published by the U.S. Department of Defense on Dec. 11, 2015), for example, CS101 and RS103, all of which are incorporated by reference herein in their entireties. Alternatively or additionally, the LIDAR sensor, or a housing or enclosure thereof, can meet (or be modified to meet) the requirements of MIL-STD-463 (entitled "Definitions and System of Units, Electromagnetic Interference and Electromagnetic Compatibility Technology," published by U.S. Department of Defense on Feb. 27, 1995), ANSI-C63.14 (entitled "American National Standard Dictionary of Electromagnetic Compatibility (EMC) including Electromagnetic Environment Effects," published by American National Standards Institute on Dec. 5, 2014), and/or MIL-STD-464, Revision D (entitled "Electromagnetic Environmental Effects Requirements for Systems," published by U.S. Department of Defense on Dec. 24, 2020), all of which are incorporated by reference herein in their entireties.

Figure 2:
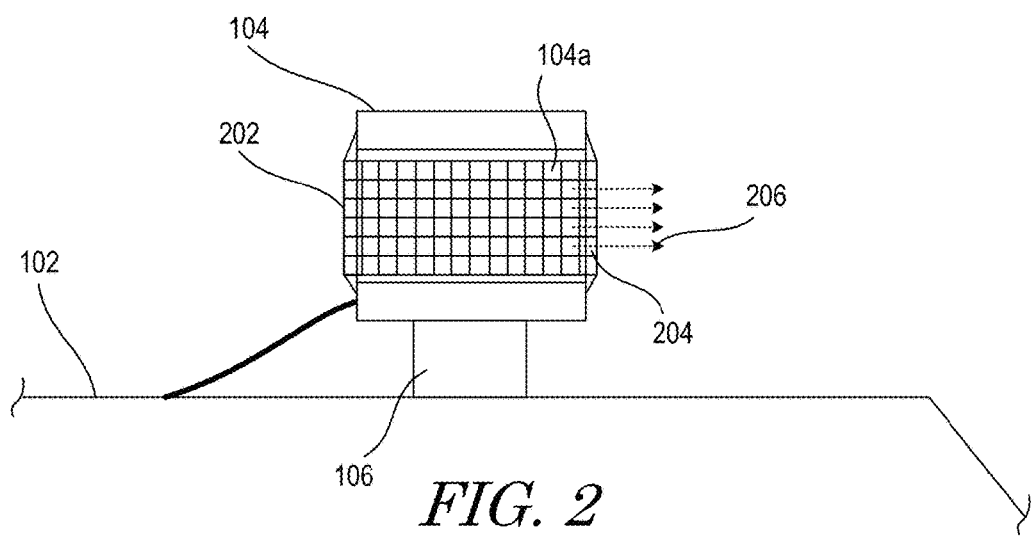
FIG. 2 is a simplified schematic diagram of a LIDAR sensor system employing an electromagnetic shield, according to one or more embodiments of the disclosed subject matter.

In some embodiments, the LIDAR sensor can include, or be coupled to, a modified power input stage and/or electromagnetic interference (EMI) shielding. For example, as shown in FIG. 2, a metal grid shield 202 (e.g., copper mesh) can be mounted in, on, or over the sensing interface 104a (e.g., sensor window). Alternatively or additionally, the EMI shielding can comprise a shielding film disposed in, on, or over the sensing interface 104a. The use of EMI shielding with respect to the sensing interface may, however, interfere with operation of the LIDAR sensor. For example, LIDAR sensors may operate at infrared (IR) wavelengths, such as 850 nm, 905 nm, and/or 1550 nm. The use of shielding films or grids designed for visible radiation windows may thus cause problems when applied to LIDAR sensors. Accordingly, in some embodiments, the EMI shielding can be designed to avoid interfering with the IR operating wavelengths, e.g., by appropriate selection of the material composition and/or grid spacing. For example, the EMI shielding can be configured as and/or comprise EmiClare MicroMesh (sold by Optical Filters Ltd., Thane, United Kingdom). Alternatively or additionally, the EMI shielding can be configured as and/or comprise a transparent conductive oxide (e.g., indium tin oxide (ITO)) or polymer.

Alternatively or additionally, in some embodiments, the LIDAR sensor can be configured to operate around the grid lines of the shield 202, for example, by transmitting light beams 206 only through openings 204 in the grid shield 202 and/or receiving reflected light only through the openings 204 in the grid shield 202. In some embodiments, the LIDAR sensor can be programmed to direct light beams at discreet points through the mesh (e.g., through openings between wires of the mesh), for example, by controlling movement of the scanning mirror and/or timing of illumination by the light source.

IV. Environmental Effects

In some embodiments, the LIDAR sensor system can be constructed to reliably operate across a wide range of environmental conditions and may meet at least the requirements of MIL-STD-810G, Part Three, entitled "Test Method Standard: Environmental Engineering Considerations and Laboratory Tests," published by the U.S. Department of Defense on Apr. 15, 2014, which is incorporated by reference herein. For example, in some embodiments, the LIDAR sensor system can be constructed to operate and/or survive exposure to at least the following conditions: (i) Operating Temperature: −40° C. to +49° C.; (ii) Storage Temperature: −46° C. to +71° C.; (iii) Solar Radiation: 1120 W/m$^3$; (iv) Operating Humidity: 88% at 41° C.

In some embodiments, a heating device (e.g., a resistive heating element) can be thermally coupled to the LIDAR sensor and configured to increase a temperature thereof, for example, when operating at the lower end of the required temperature ranges (e.g., for temperatures below 0° C., such as ≤−10° C.). Alternatively, in some embodiments, the heating device can be integrated with or form a part of the LIDAR sensor. In some embodiments, a cooling device (e.g., a thermoelectric cooling device) can be thermally coupled to the LIDAR sensor and configured to decrease a temperature thereof, for example, when operating at the higher end of the required temperature ranges (e.g., for temperatures above 35° C., such as ≥50° C.). Alternatively, in some embodiments, the cooling device can be integrated with or form a part of the LIDAR sensor. In some embodiments, the heating device and the cooling device may be the same device, for example, a heat pump that operates in a first mode of operation to heat the LIDAR sensor and in a second mode of operation to cool the LIDAR sensor.

Figure 3A:
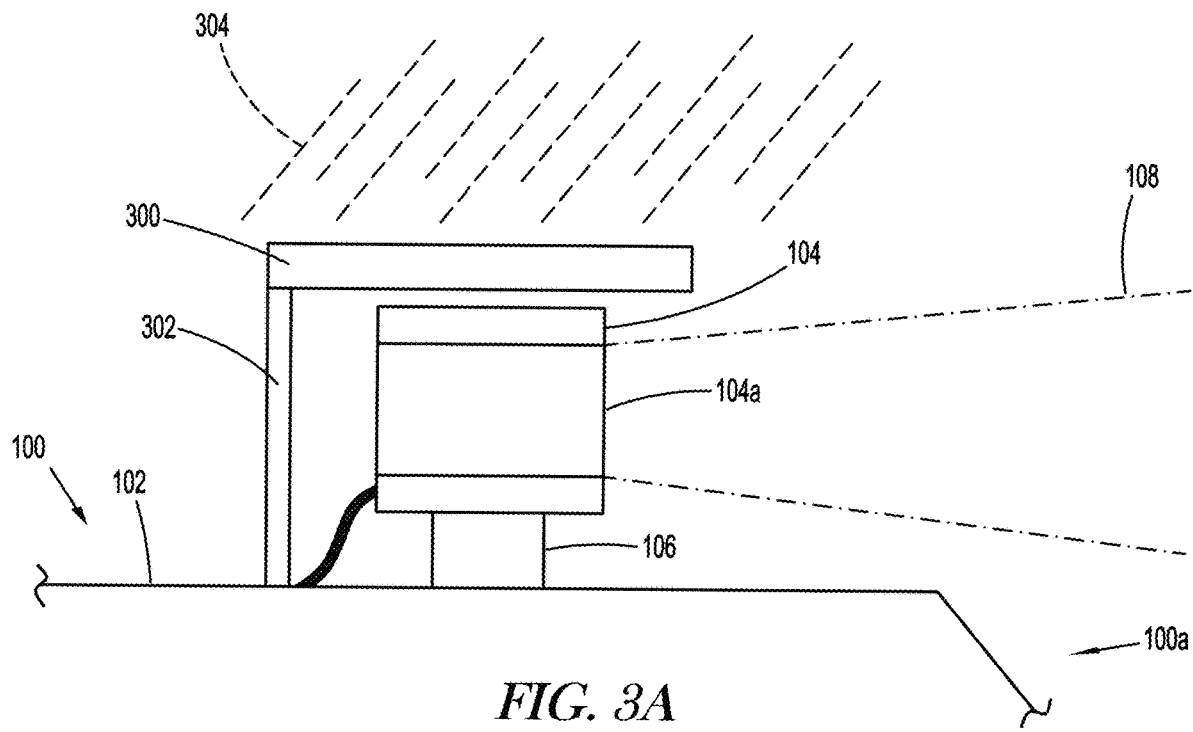
FIG. 3A is a simplified schematic diagram of a LIDAR sensor system employing an environmental shield, according to one or more embodiments of the disclosed subject matter.
Figure 3B:
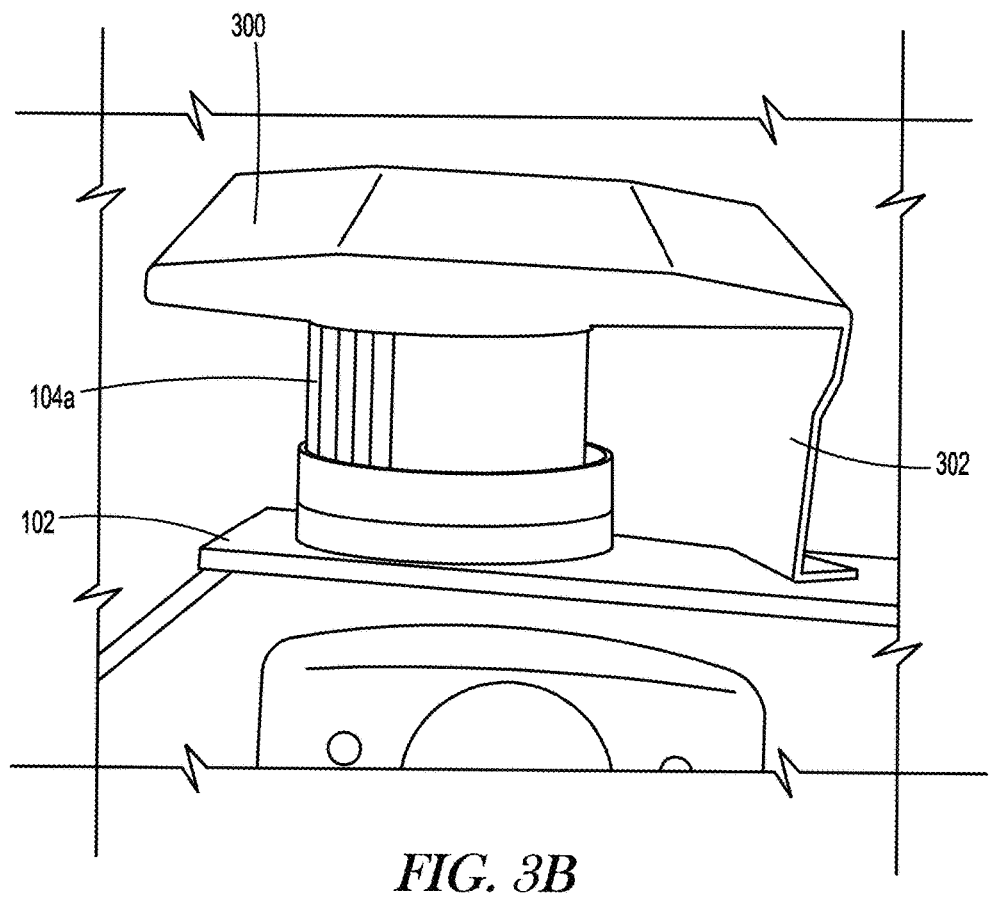
FIG. 3B shows a LIDAR sensor system employing an exemplary shield for solar loading mitigation, according to one or more embodiments of the disclosed subject matter.

In some embodiments, a solar shield (e.g., umbrella) can be provided, for example, to protect the LIDAR sensor from solar loading (which may increase a temperature of the sensor into a non-operation range) and/or weather. For example, FIGS. 3A-3B illustrate a solar shield 300 mounted to the vehicle roof 102 via support 302 (e.g., vertically-extending member). In the illustrated example, the solar shield 300 extends laterally (e.g., horizontally, from rear to front) over LIDAR sensor 104, so as to protect the sensor from solar radiation 304. The support 302 can be arranged toward a rear of the vehicle 100, for example, to avoid obstructing, or at least minimizing obstruction of, a detection field-of-view 108 of the LIDAR sensor 104. Alternatively or additionally, in some embodiments, the solar shield can be mounted on, or otherwise coupled to, the LIDAR sensor 104 (e.g., a top surface thereof). In such embodiments, the support 302 connecting to the vehicle roof 102 can be omitted, for example, to avoid the potential for obstructing the detection field-of-view 108. Alternatively or additionally, in some embodiments, the solar shield can be mounted on, or otherwise coupled to, a part of the vehicle other than the roof, or formed by an existing overhang or recessed portion of the vehicle.

V. Impulse Shock

Figure 4A:
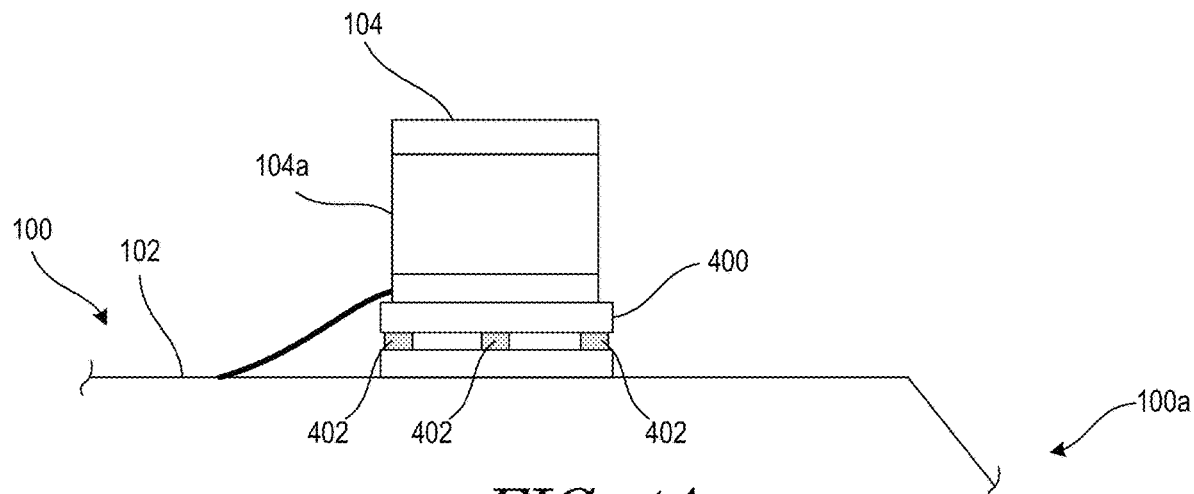
FIG. 4A is a simplified schematic diagram of a LIDAR sensor system employing a shock mount, according to one or more embodiments of the disclosed subject matter.

In some embodiments, the LIDAR sensor can be protected from impulse shocks that may otherwise damage components thereof (e.g., spinning mirrors for redirecting interrogating light and/or detected light, or other internal optical and/or electrical components), for example, via a shock mount (e.g., vibration isolation device). For example, in FIG. 4A, LIDAR sensor 104 is coupled to the vehicle 100 (e.g., roof 102) via shock mount 400. In the illustrated example of FIG. 4A, shock mount 400 includes one or more flexible isolation members 402 (e.g., coil springs and/or dampers). In some embodiments, isolation members 402 can be constructed to allow LIDAR sensor 104 to move independently of roof 102 of the vehicle 100 while still being mounted securely thereto. Vibration or shocks experienced by the vehicle 100 can thus be absorbed by the isolation members 402 rather than being transmitted to the LIDAR sensor 104.

As used herein, "shock mount" refers to devices known in the art as shock mounts or vibration isolation devices, as well as any compliant structure whether or not specifically designed to accommodate vibrations or shocks resulting from a blast and/or vehicle operation in a rugged (e.g., off-road) environment. For example, in some embodiments, a LIDAR sensor may be purposefully decoupled from the vehicle and/or other sensors via one or more relatively-compliant mounting structures, for example, due to space constraints, aesthetic reasons, and/or sensor ruggedness. Such embodiments may also benefit from the measurement of relative motion (e.g., between the LIDAR sensor and other sensors (e.g., IMU, RADAR, other LIDARS) and/or the vehicle), for example, as described in further detail below with respect to FIGS. 4B-4E.

In some embodiments, the use of a compliant structure (e.g., shock mount) to couple the LIDAR sensor to the vehicle can introduce relative motion between the LIDAR sensor and the vehicle. In other words, the sensor may move differently than the vehicle due to the flexibility of the shock mount, which can introduce errors in detecting object locations with respect to the vehicle. Accordingly, in some embodiments, the position of the LIDAR sensor can be independently tracked, for example, to determine its movement relative to the vehicle in order to correct the sensed data of the LIDAR sensor. For example, in some embodiments, an inertial measurement unit (IMU, also known as an inertial measurement system (IMS)) can be used to measure movement of the LIDAR sensor. In some embodiments, the IMU can comprise one or more gyroscopes and/or accelerometers, such as a microelectromechanical system (MEMS) gyroscope and/or MEMS accelerometer. Alternatively or additionally, other motion tracking sensors and/or configurations can be used to determine movement of the LIDAR sensor relative to the vehicle, such as but not limited to non-contact capacitive displacement sensors, laser displacement sensors, and/or optical imaging of a target (e.g., by an optical sensor on the LIDAR sensor of a fiducial, feature, or other target on the vehicle, or vice versa).

Figure 4B:
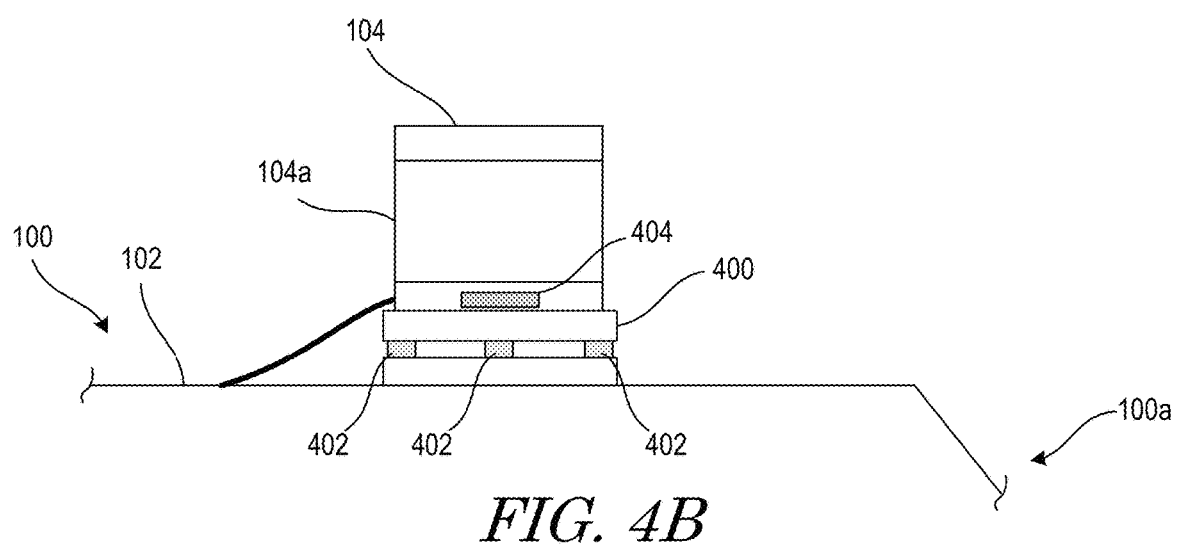
FIG. 4B is a simplified schematic diagram of a LIDAR sensor system with shock mount and inertial measurement unit (IMU), according to one or more embodiments of the disclosed subject matter.
Figure 4C:
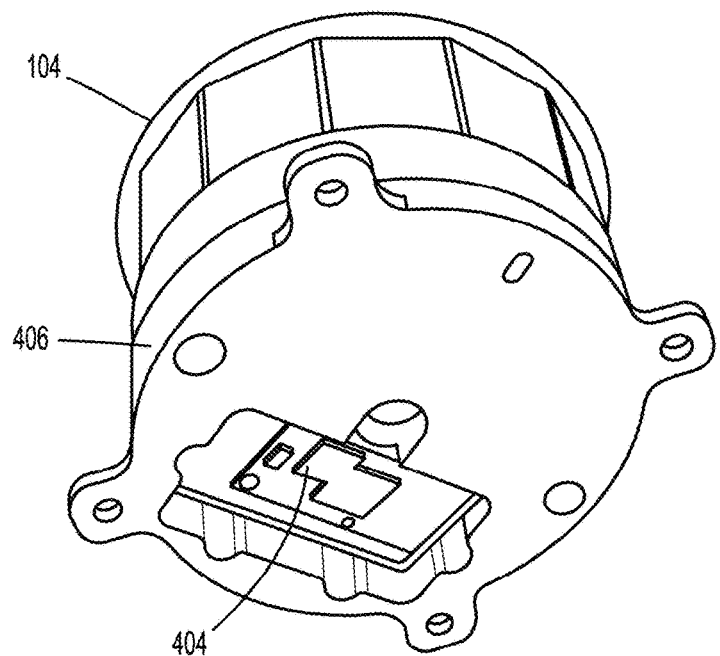
FIG. 4C is a bottom perspective view of a LIDAR sensor system with integrated IMU, according to one or more embodiments of the disclosed subject matter.

For example, in FIG. 4B, IMU 404 is coupled to LIDAR sensor 104 in order to measure motion thereof. In some embodiments, the IMU 404 can be coupled directly the LIDAR sensor 104, for example, within base 406 of the LIDAR sensor 104, as illustrated in FIG. 4C. Alternatively, in some embodiments, the IMU 404 can be integrated with the LIDAR sensor 104, for example, as a module within electronics of the LIDAR sensor. Alternatively, in some embodiments, the IMU 404 can be indirectly mounted to the LIDAR sensor 104, for example, by being coupled to the upper plate of shock mount 400 to which the LIDAR sensor 104 is also rigidly coupled. A controller (e.g., integrated with the LIDAR sensor 104 or separate therefrom, such as within vehicle 100) can use the information from the IMU 404 to adjust the location of objects detected by the LIDAR sensor 104 to compensate for the motion of the LIDAR sensor 104 relative to the vehicle 100 (e.g., vehicle roof 102).

Figure 4D:
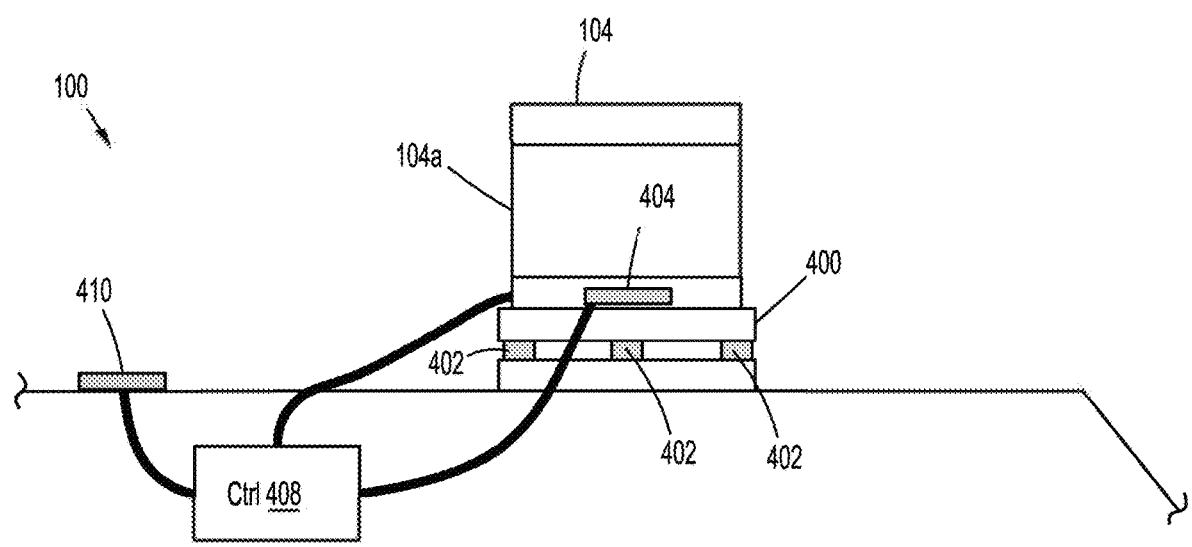
FIG. 4D is a simplified schematic diagram of a LIDAR sensor system with IMU and the vehicle with separate IMU, according to one or more embodiments of the disclosed subject matter.

Alternatively or additionally, in some embodiments, the vehicle can have its own IMU. In FIG. 4D, the vehicle 100 has a second IMU 410 (e.g., mounted to the roof 102 in a region proximal to LIDAR sensor 104) constructed to measure movement of the vehicle 100. Alternatively, in some embodiments, the second IMU 410 can be indirectly mounted to the vehicle, for example, by being coupled to the lower plate of shock mount 400 to which the vehicle roof is also rigidly coupled. Controller 408 (shown within vehicle 100 but may instead be integrated with LIDAR sensor 104 or elsewhere) can use the information from both IMUs 404, 410 to determine motion of the LIDAR sensor 104 relative to the vehicle 100 and to adjust the location of objects detected by the LIDAR sensor 104 to compensate for the relative motion. For example, controller 408 can determine locations of features in the environment relative to the LIDAR sensor 104 based on reflected light detected by the LIDAR sensor 104. If IMU 404 detects movement of LIDAR sensor 104 that differs from movement of vehicle 100 detected by IMU 410, controller 408 can account for the relative motion in converting the locations of the detected features to be relative to the vehicle 100. Alternatively or additionally, controller 408 can account for any change in field-of-view of the LIDAR sensor 104 caused by relative motion of the LIDAR sensor 104 with respect to vehicle 100, based at least in part on data provided by IMU 404 and/or IMU 410.

Figure 4E:
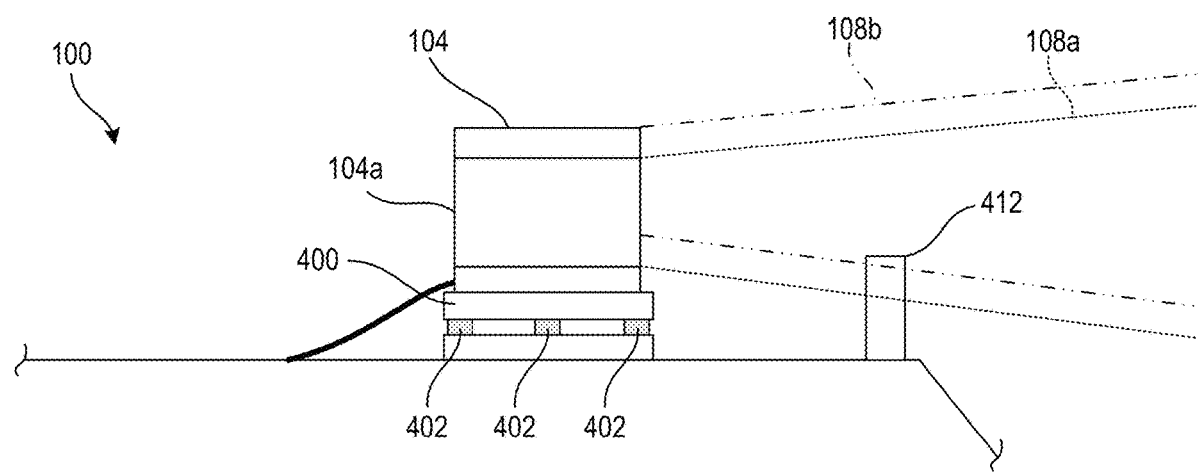
FIG. 4E is a simplified schematic diagram of a LIDAR sensor system employing feature registration for sensor stabilization, according to one or more embodiments of the disclosed subject matter.

Alternatively or additionally, in some embodiments, relative motion of the LIDAR sensor can be determined based on detection of features or objects by the LIDAR sensor. For example, in FIG. 4E, LIDAR sensor 104 has an augmented field-of-view 108a that registers parts or features 412 of vehicle 100. Relative motion between the LIDAR sensor 104 and the vehicle 100 results in a skewed field-of-view 108b and thereby an apparent changed location for feature 412 in the detection field. A controller (e.g., integrated with the LIDAR sensor 104 or separate therefrom, such as within vehicle 100) can use the information from the changed location of the feature 412 detected by the LIDAR sensor 104 to compensate for the motion of the LIDAR sensor 104 relative to the vehicle 100 (e.g., vehicle roof 102). For example, the feature 412 can be an existing rigid structure or portion of the roof profile (e.g., a front corner of the roof) of the vehicle. Alternatively, in some embodiments, the feature 412 can be a structure (e.g., a rod or non-functional antenna projecting from the roof) added to the vehicle solely for use in correcting the LIDAR sensor. Although only a single feature 412 is shown in FIG. 4E, embodiments are not limited thereto. Rather, more than one feature 412 can be provided as part of or coupled to the vehicle 100, and the controller can use one, some, or all of the features detected by the LIDAR sensor in determining and/or compensating for motion of the LIDAR sensor relative to the vehicle.

VI. Blast Overpressure

In some embodiments, a housing or enclosure can be provided to protect the LIDAR sensor from explosion-induced shock waves (e.g., blast overpressure). For example, the housing may be constructed to protect the LIDAR sensor (or at least delicate optics therein, such as scanning mirror, laser source, and light detector) from an overpressure of at least 1 psi (7 kPa). In some embodiments, the housing can be integrated with the LIDAR sensor (e.g., to define sensing interface 104a). Alternatively or additionally, in some embodiments, the housing can be separate from the LIDAR sensor and attached thereto, and/or attached to the vehicle 100 and surrounding the sensor.

In some embodiments, the housing or enclosure can be designed to redirect pressure waves away from the sensing interface 104a. Alternatively or additionally, the housing or enclosure can be designed to prevent, or at least reduce the impact of, large pressure differences (e.g., the difference between pressure within the housing and pressure outside the housing) from compromising seals of the housing and/or the LIDAR sensor (e.g., any seals around the sensing interface 104a), for example, by the use of one or more pressure relief valves. In some embodiments, the sensing interface 104a itself (e.g., window, which may be a window of the housing) can be designed to tolerate exposure to blast debris or other projectiles without damage (e.g., cracking, breaking, and/or scratches) or with only minimal damage. For example, the sensing interface 104a can be formed of a blast-resistant glass (e.g., laminated glass, such as Vetrogard+, sold by Vetrotech Saint-Gobain, Auburn, Washington) or a bulletproof glass (e.g., laminations of glass and/or polymers, such as polycarbonate, acrylic, or aluminum oxynitride).

Alternatively or additionally, in some embodiments, the housing or enclosure can be provided with and/or comprise one or more features designed to accommodate pressure changes, for example, induced by a blast. For example, the LIDAR sensor, or a housing or enclosure surrounding the LIDAR sensor, can have one or more compliant members (e.g., flexible bladder) that allow for the air volume contained therein to expand or contract in response to the blast-induced pressure changes, so as to prevent damage to the LIDAR sensor or components thereof. Alternatively or additionally, in some embodiments, the compliant member can be constructed to accommodate changes in volume of the sealed interior volume 514, for example, due to changes in temperature.

Figure 5A:
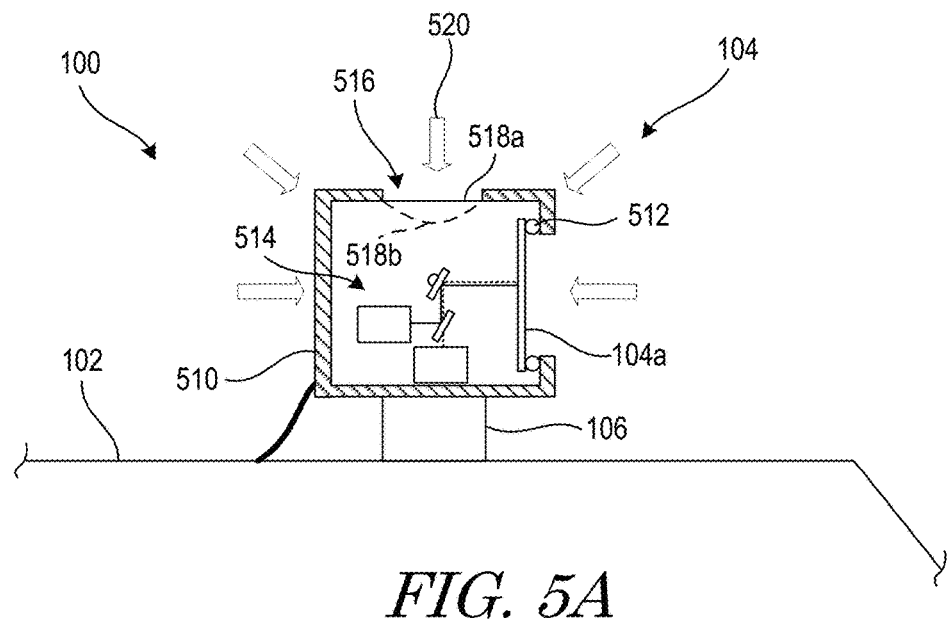
FIG. 5A is a simplified schematic diagram of a LIDAR sensor system with pressure accommodation features, according to one or more embodiments of the disclosed subject matter.

For example, in FIG. 5A, LIDAR sensor 104 has a housing 510 that surrounds and/or defines a sealed interior volume 514 with sensitive components therein (e.g., laser source, detector, rotating mirror, beam splitter, control electronics etc.). The sensing interface 104a (e.g., window) can be coupled to the housing 510 via one or more sealing members 512 (e.g., gasket), which may otherwise be compromised when exposed to pressure from blast 520. In the illustrated example, the housing 510 has an orifice 516 that is exposed to the external environment so as to receive pressure from blast 520, and a compliant member extends across the orifice 516 so as to seal interior volume 514 from the external environment. The compliant member can be constructed to deform from an initial position 518a to deflected position 518b so as to accommodate the pressure from blast 520, for example, to equalize a pressure in the interior volume 514 with a pressure external to the housing 510 (or at least reduce a difference in pressure between the interior volume 514 and the external environment) so as to avoid compromising sealing member 512 and/or damaging sensing interface 104a.

VII. Input Power

In some embodiments, the LIDAR sensor system can be provided with or include an input power stage, which provides electrical power to the LIDAR sensor for operation thereof. For example, the input power stage can meet at least the requirements of MIL-STD-1275E, entitled "Interface Standard: Characteristics of 28 Volt DC Electrical Systems in Military Vehicles," published by the U.S. Department of Defense on Mar. 22, 2013, which is incorporated by reference herein it is entirety. In some embodiments, the input power stage can be constructed as a small form factor device (e.g., having a size less than 50% that of the LIDAR sensor, for example, less than 10% the size of the LIDAR sensor). In some embodiments, the input power stage can have an EMI filter and a DC-DC converter. For example, the input power stage can be designed to provide 16-40 V operational range, 6 V transient and capable of handling a surge of 100 V for 50 ms without degradation and while continuing to provide a regulated output.

Figure 5B:
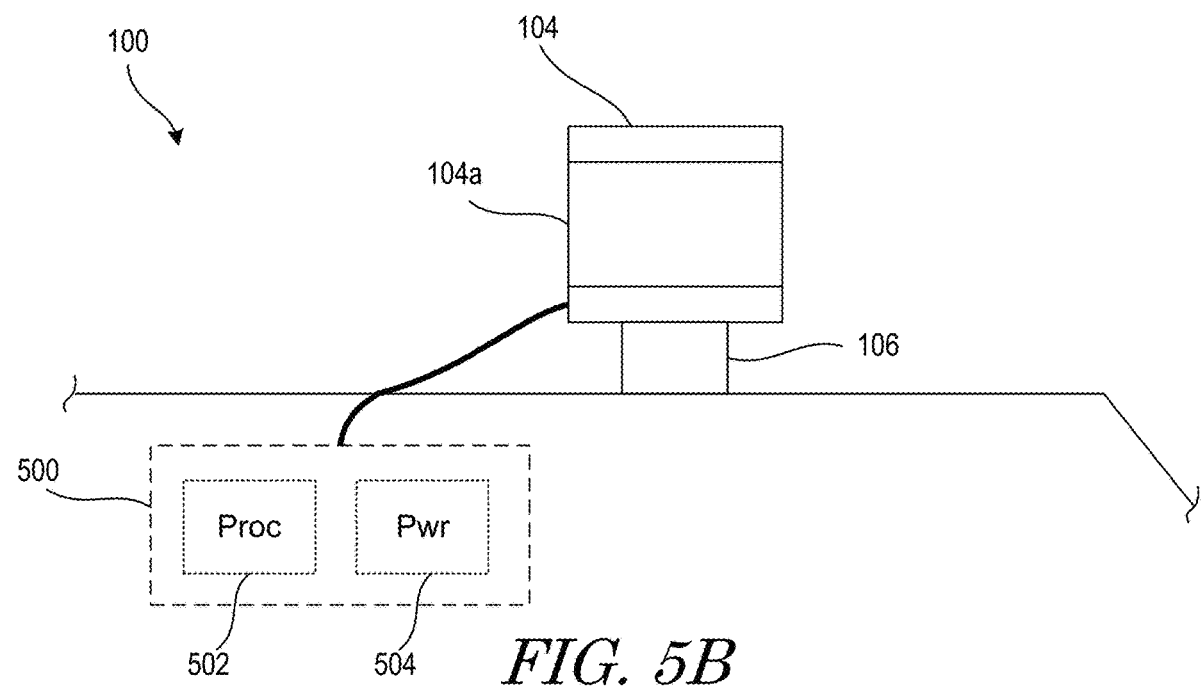
FIG. 5B is a simplified schematic diagram of a LIDAR sensor system with an input power stage, according to one or more embodiments of the disclosed subject matter.

In some embodiments, the input power stage can be provided as part of (e.g., as a module of) a controller of the LIDAR sensor system. For example, FIG. 5B illustrates a controller 500 having a processor 502 and an input power stage 504. The processor 502 can be configured to control the input power stage 504 (e.g., to control an input power applied to LIDAR sensor 104) and/or control operation of the LIDAR sensor 104 (e.g., to control LIDAR sensor 104 to interrogate regions in the surrounding environment, to process raw data signals from the LIDAR sensor 104 to detect objects in the surrounding environment, and/or to adjust data from the LIDAR sensor 104 to compensate for movement of the sensor 104 or other errors in the data).

VIII. External Interface Cleaning

In some embodiments, one or more cleaning devices, systems, or modules can be provided to clean the LIDAR sensor system after environmental contamination. For example, the external interfaces of the LIDAR sensor critical to operation (e.g., external-facing sensing interface 104a) can be cleaned after being coated by dust, water, mud, etc. In some embodiments, the cleaning can be performed periodically (e.g., on a regular and/or predetermined schedule) and/or on demand (e.g., in response to a manual request and/or in response to a detected decline in detection capability or an increase in noise due to coating of the interface).

Figure 6A:
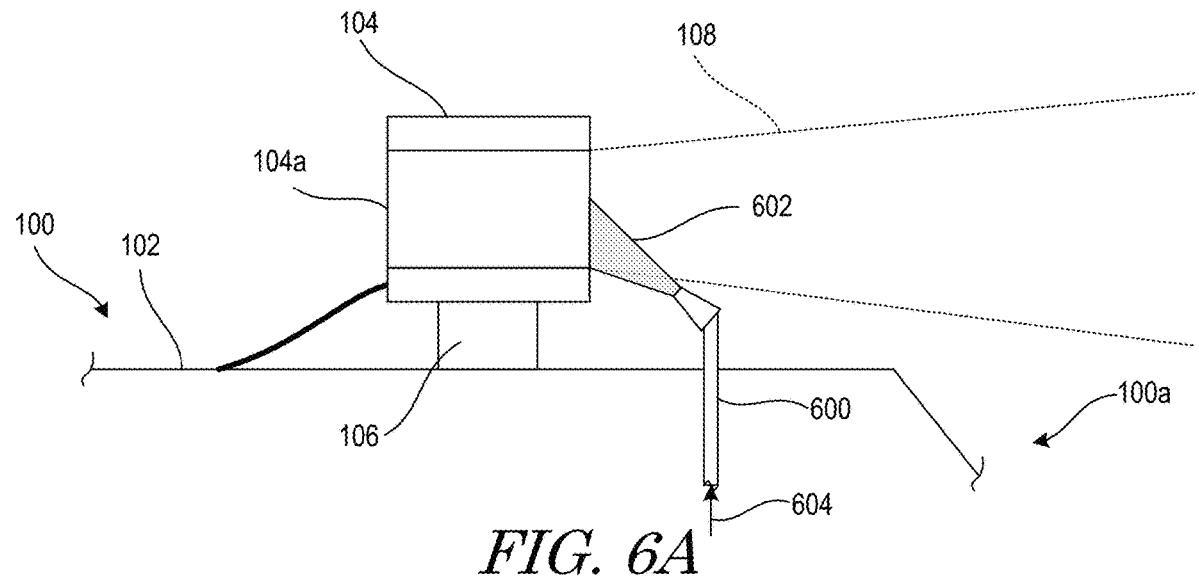
FIG. 6A is a simplified schematic diagram of a LIDAR sensor system and a cleaning device employing fluid to clean a sensor interface, according to one or more embodiments of the disclosed subject matter.

In some embodiments, the cleaning device can employ a fluid, such as a fluid already available in the vehicle (e.g., window-washing fluid, for use in cleaning the windshield of the vehicle). For example, FIG. 6A illustrates a cleaning device 600 that receives fluid 604 from vehicle 100 and directs the fluid as a spray 602 toward sensing interface 104a of LIDAR sensor 104 to effect cleaning thereof. In some embodiments, cleaning device 600 may be substantially static, e.g., remain in the same position when actuated for cleaning and/or between cleanings. Alternatively, in some embodiments, the cleaning device 600 can be deployed from a stowed position (e.g., within vehicle 100 and/or out of field-of-view 108 of LIDAR sensor 104) to a cleaning position and/or can be moved to clean different portions of sensing interface 104a.

Figure 6B:
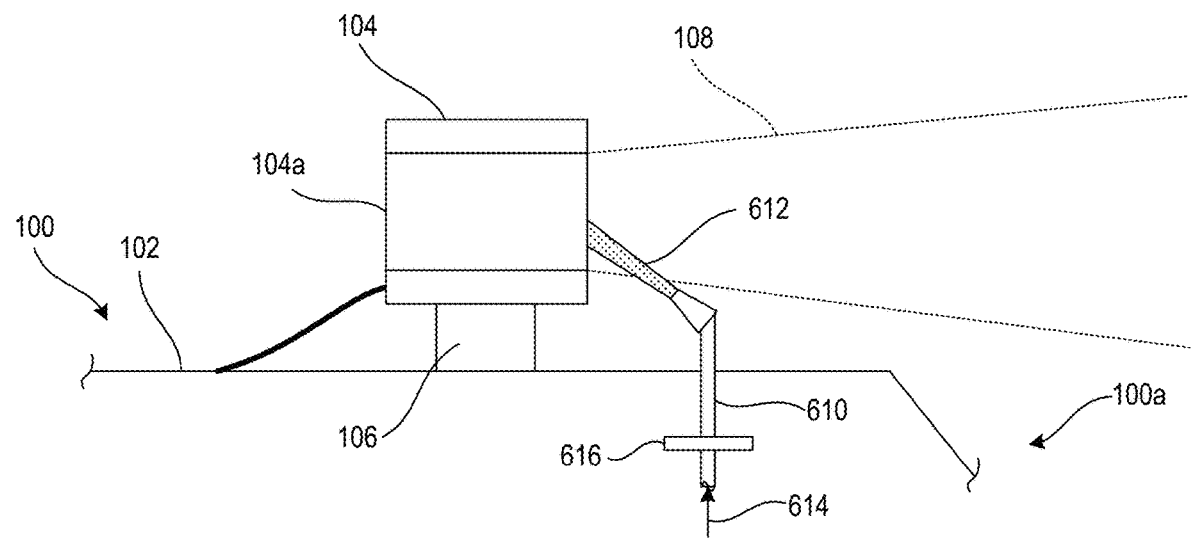
FIG. 6B is a simplified schematic diagram of a LIDAR sensor system and another cleaning device employing compressed air to clean a sensor interface, according to one or more embodiments of the disclosed subject matter.

Alternatively or additionally, in some embodiments, the cleaning device can employ pressurized or compressed air, such as compressed air already available in the vehicle. For example, FIG. 6B illustrates a cleaning device 610 that receives compressed air 614 from the vehicle 100 and directs the compressed air as a focused airstream 612 toward sensing interface 104a of LIDAR sensor 104 to effect cleaning thereof. In some embodiments, cleaning device 610 may be substantially static, e.g., remain in the same position whether actuated for cleaning or between cleanings. Alternatively, in some embodiments, cleaning device 610 can be deployed from a stowed position (e.g., within vehicle 100 and/or out of field-of-view 108 of LIDAR sensor 104) to a cleaning position and/or can be moved to clean different portions of sensing interface 104a. In some embodiments, the compressed air may be contaminated (e.g., oil, dust, or other debris), for example, when the vehicle is a service or military vehicle. In such embodiments, prior to use for cleaning the LIDAR sensor 104, the compressed air 614 can be passed through a filter or dryer, such as filtering device 616. For example, the filtering device 616 can comprise a compressed air filter for oil removal, a coalescing filter for removing water or aerosols, a vapor removal filter for removing gaseous lubricants, a dry particulate filter, or any combination thereof.

Alternatively or additionally, in some embodiments, the cleaning device can employ one or more wipers that contact and/or traverse the surface of the sensing interface 104a, for example, in a manner similar to conventional automobile windshield wipers. However, in such embodiments, the wipers can be designed to avoid damaging, or at least reduce any damage to, the sensing interface 104a, for example, any specialty coatings thereon. Alternatively or additionally, in some embodiments, the operation of the wipers can be coordinated with the scanning of the LIDAR sensor 104, for example, to avoid obstruction of illumination from the LIDAR sensor 104 and/or reflections to be detected by the LIDAR sensor 104.

IX. Autonomous Vehicle with Stabilized LIDAR Sensor

Figure 7A:
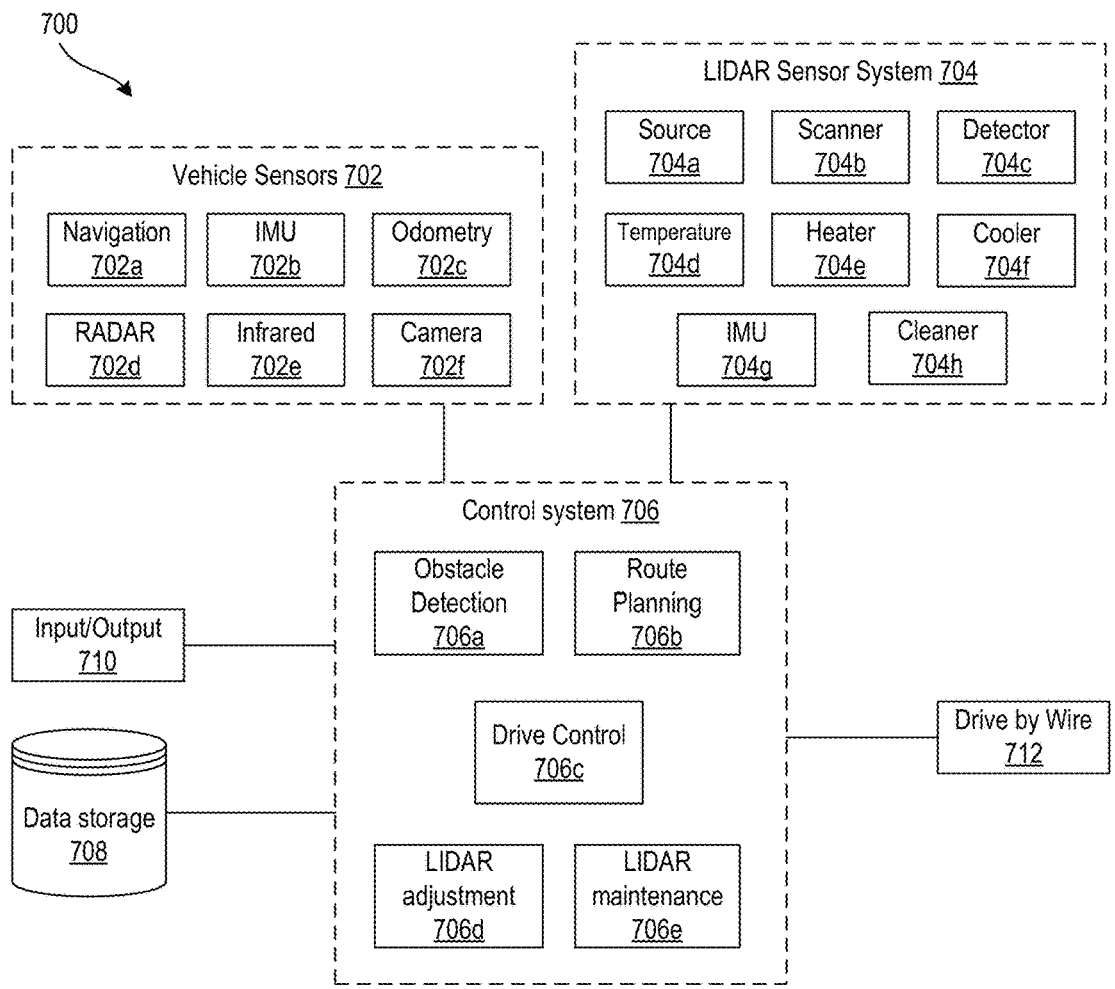
FIG. 7A is a simplified schematic diagram illustrating certain aspects of an on-board operating environment of an autonomous vehicle, according to one or more embodiments of the disclosed subject matter.

FIG. 7A illustrates an exemplary configuration of an autonomous vehicle system 700. The system 700 can include control system 706, one or more vehicle sensors 702, LIDAR sensor system 704, and drive-by-wire system 712. The drive-by-wire system 712 can include, for example, electrical and/or electro-mechanical components for performing vehicle functions traditionally provided by mechanical linkages, e.g., braking, gearing, acceleration, steering. In some embodiments, system 700 can further include user interface 710 and/or one or more memories or databases. For example, system 700 can include one or more databases 708 that store driving rules (e.g., "rules of the road") and/or a road or terrain map of an area in which the vehicle operates.

In some embodiments, the vehicle sensors 702 can include a navigation sensor 702a, an inertial measurement unit (IMU) 702b, an odometry sensor 702c, a radio detection and ranging (RADAR) system 702d, an infrared (IR) imager 702e, a visual camera 702f, or any combination thereof. Other sensors are also possible according to one or more contemplated embodiments. For example, sensors 702 can further include an ultrasonic or acoustic sensor for detecting distance or proximity to objects, a compass to measure heading, inclinometer to measure an inclination of a path traveled by the vehicle (e.g., to assess if the vehicle may be subject to slippage), ranging radios (e.g., as disclosed in U.S. Pat. No. 11,234,201, incorporated herein by reference), or any combination thereof.

In some embodiments, the navigation sensor 702a can be used to determine relative or absolute position of the vehicle. For example, the navigation sensor 702a can comprise one or more global navigation satellite systems (GNSS), such as a global positioning system (GPS) device.

In some embodiments, IMU 702b can be used to determine orientation or position of the vehicle. Alternatively or additionally, IMU 702b can be mounted proximal to the LIDAR sensor 704 or on a shock mount of the LIDAR sensor 704, for example, for use in determining relative motion of the LIDAR sensor 704 (e.g., as described above with respect to FIG. 4D above). In some embodiments, the IMU 702b can comprise one or more gyroscopes or accelerometers, such as a microelectromechanical system (MEMS) gyroscope or MEMS accelerometer.

In some embodiments, the odometry sensor 702c can detect a change in position of the vehicle over time (e.g., distance). In some embodiments, odometry sensors 702c can be provided for one, some, or all of wheels of the vehicle, for example, to measure corresponding wheel speed, rotation, and/or revolutions per unit time, which measurements can then be correlated to change in position of the vehicle. Alternatively or additionally, the odometry sensors provided for multiple wheels can be used to detect slippage of one or more of the wheels, for example, due to weather conditions. For example, the odometry sensor 702c can include an encoder, a Hall effect sensor measuring speed, or any combination thereof.

In some embodiments, the RADAR system 702d can use irradiation with radio frequency waves to detect obstacles or features within an environment surrounding the vehicle. In some embodiment, the RADAR system 702d can be configured to detect a distance, position, and/or movement vector of a feature (e.g., obstacle) within the environment. For example, the RADAR system 702d can include a transmitter that generates electromagnetic waves (e.g., radio frequency or microwaves), and a receiver that detects electromagnetic waves reflected back from the environment.

In some embodiments, the IR sensor 702e can detect infrared radiation from an environment surrounding the vehicle. In some embodiments, the IR sensor 702e can detect obstacles or features in low-light level or dark conditions, for example, by including an IR light source (e.g., IR light-emitting diode (LED)) for illuminating the surrounding environment. Alternatively or additionally, in some embodiments, the IR sensor 702e can be configured to measure temperature based on detected IR radiation, for example, to assist in classifying a detected feature or obstacle as a person or vehicle.

In some embodiments, the camera sensor 702f can detect visible light radiation from the environment, for example, to determine features (e.g., obstacles) within the environment. For example, the camera sensor 702f can include an imaging sensor array (e.g., a charge-coupled device (CCD) or complementary metal-oxide semiconductor (CMOS) sensor) and associated optical assembly for directing light onto a detection surface of the sensor array (e.g., lenses, filters, mirrors, etc.). In some embodiments, multiple camera sensors 702f can be provided in a stereo configuration, for example, to provide depth measurements.

In some embodiments, the LIDAR sensor system 704 can include an illumination light source 704a (e.g., laser or laser diode), an optical assembly 704b for directing light to/from the system (e.g., one or more static or moving mirrors (such as a rotating mirror), phased arrays, lens, filters, etc.), and a photodetector 704c (e.g., a solid-state photodiode or photo-multiplier). In some embodiments, the LIDAR sensor system 704 can use laser illumination to measure distances to obstacles or features within an environment surrounding the vehicle. In some embodiments, the LIDAR sensor system 704 can be configured to provide three-dimensional imaging data of the environment, and the imaging data can be processed (e.g., by the LIDAR system itself or by a module of control system 706) to generate a view of the environment (e.g., at least a 180-degree view, a 270-degree view, or a 360-degree view).

In some embodiments, the LIDAR sensor system 704 can further include a temperature sensor 704d (e.g., a thermocouple), a heating device 704e (e.g., a resistive heating element or a heat pump), and/or a cooling device 704f (e.g., a thermoelectric cooling device or a heat pump). In some embodiments, the heating device 704e can be used to heat the LIDAR sensor system 704 (e.g., the optical components thereof), for example, in response to detection by temperature sensor 704d of a temperature of the LIDAR sensor system 704 approaching or being less than a first threshold temperature (e.g., less than 0° C.). Alternatively or additionally, in some embodiments, the cooling device 704f can be used to cool the LIDAR sensor system 704 (e.g., the optical components thereof), for example, in response to detection by temperature sensor 704d of a temperature of the LIDAR sensor system 704 approaching or being greater than a second threshold temperature (e.g., greater than 35° C.). In some embodiments, the LIDAR sensor system 704 or a module of the control system 706 (e.g., LIDAR maintenance module 706e) can receive signals from the temperature sensor 704d and control operation of the heating device 704c and/or the cooling device 704f responsively thereto.

In some embodiments, the LIDAR sensor system 704 can further include one or more IMUs 704g. For example, IMU 704g can be mounted on LIDAR sensor 704 or a shock mount of the LIDAR sensor 704. In some embodiments, IMU 704g can be used to determine movement of the LIDAR sensor 704 (e.g., the optical components thereof), for example, relative to the vehicle (e.g., as described above with respect to FIG. 4D above). In some embodiments, the IMU 704g can comprise one or more gyroscopes or accelerometers, such as a microelectromechanical system (MEMS) gyroscope or MEMS accelerometer. In some embodiments, the LIDAR sensor system 704 or a module of the control system 706 (e.g., LIDAR adjustment module 706d) can receive signals from the IMU 704g and/or IMU 702b and can adjust detection by the LIDAR sensor system 704 (e.g., the location of detected features relative to the vehicle) responsively thereto.

In some embodiments, the LIDAR sensor system 704 can further include a cleaning system 704h. For example, cleaning system 704h can comprise a fluid spray nozzle, a compressed air nozzle, a wiper, or any combination thereof. In some embodiments, the LIDAR sensor system 704 or a module of the control system 706 (e.g., LIDAR maintenance module 706c) can receive signals from the detector 704c and control operation of the cleaning system 704h responsively thereto. For example, the cleaning system 704h can be activated (e.g. by the LIDAR sensor system 704 itself or by LIDAR maintenance module 706e) in response to measurement of a degraded signal by detector 704c. Alternatively or additionally, in some embodiments, LIDAR sensor system 704 or the LIDAR maintenance module 706e can control the cleaning system 704h to periodically perform a cleaning operation.

The vehicle sensors 702 and the LIDAR sensor system 704 can be operatively coupled to the control system 706, such that the control system 706 can receive data signals from the sensors 702, 704c and control operation of the vehicle, or components thereof (e.g., source 704a, scanner 704b, heater 704c, cooler 704f, cleaner 704h, and/or drive-by-wire kit 712), responsively thereto. For example, FIG. 7A shows a configuration of a control system 706 that includes, in accordance with some embodiments, one or more modules, programs, software engines or processor instructions for performing at least some of the functionalities described herein. For example, control system 706 may comprise one or more software module(s) or engine(s) for directing one or more processors of system 706 to perform certain functions. In some embodiments, software components, applications, routines or sub-routines, or sets of instructions for causing one or more processors to perform certain functions may be referred to as "modules" or "engines." It should be noted that such modules or engines, or any software or computer program referred to herein, may be written in any computer language and may be a portion of a monolithic code base, or may be developed in more discrete code portions, such as is typical in object-oriented computer languages. In addition, the modules or engines, or any software or computer program referred to herein, may in some embodiments be distributed across a plurality of computer platforms, servers, terminals, and the like. For example, a given module or engine may be implemented such that the described functions are performed by separate processors and/or computing hardware platforms. Further, although certain functionality may be described as being performed by a particular module or engine, such description should not be taken in a limiting fashion. In other embodiments, functionality described herein as being performed by a particular module or engine may instead (or additionally) be performed by a different module, engine, program, sub-routine or computing device without departing from the spirit and scope of the invention(s) described herein.

It should be understood that any of the software modules, engines, or computer programs illustrated herein may be part of a single program or integrated into various programs for controlling one or more processors of a computing device or system. Further, any of the software modules, engines, or computer programs illustrated herein may be stored in a compressed, uncompiled, and/or encrypted format and include instructions which, when performed by one or more processors, cause the one or more processors to operate in accordance with at least some of the methods described herein. Of course, additional and/or different software modules, engines, or computer programs may be included, and it should be understood that the examples illustrated and described with respect to FIG. 7A are not necessary in any embodiments. Use of the terms "module" or "engine" is not intended to imply that the functionality described with reference thereto is embodied as a stand-alone or independently functioning program or application. While in some embodiments functionality described with respect to a particular module or engine may be independently functioning, in other embodiments such functionality is described with reference to a particular module or engine for case or convenience of description only and such functionality may in fact be a part of, or integrated into, another module, engine, program, application, or set of instructions for directing a processor of a computing device.

In some embodiments, the instructions of any or all of the software modules, engines or programs described above may be read into a main memory from another computer-readable medium, such from a read-only memory (ROM) to random access memory (RAM). Execution of sequences of instructions in the software module(s) or program(s) can cause one or more processors to perform at least some of the processes or functionalities described herein. Alternatively or additionally, in some embodiments, hard-wired circuitry may be used in place of, or in combination with, software instructions for implementation of the processes or functionalities described herein. Thus, the embodiments described herein are not limited to any specific combination of hardware and software.

In the illustrated example of FIG. 7A, the control system 706 includes an obstacle detection module 706a, a route planning module 706b, a drive control module 706c, a LIDAR adjustment module 706d, and/or a LIDAR maintenance module 706e. In some embodiments, the route planning module 706b can be configured to plan a route for the vehicle to follow. In some embodiments, the route planning module 706b can employ data stored in database 708 regarding rules of the road and/or the road network or area to plan a route while avoiding known or detected obstacles in the environment. In some embodiments, the control system 706 can use signals from the sensors 702, 704 to identify traversable paths through the area, for example, using vehicle position and/or features identified in the surrounding environment by one or more of sensors 702a-702f, 704. In some embodiments, drive control module 706c can then control the drive-by-wire system 712 (e.g., an electrical or electro-mechanical system that controls steering, gearing, acceleration, and braking, for example, via control of wheels and respective propulsion units) to have the vehicle follow the planned route. Alternatively or additionally, in some embodiments, the control system 706 can control the drive-by-wire system 712 based one or more signals received via a communication system (e.g., transceiver for wireless communication), for example, to follow another vehicle (e.g., autonomous or manually-operated leader vehicle). In some embodiments, the obstacle detection module 706a can be configured to detect obstacles (e.g., impassable road features, other vehicles, pedestrians, etc.) as the vehicle moves. Control system 706 can be further configured to avoid the detected obstacles, for example, by instructing the vehicle to follow an alternative path.

In some embodiments, the system 700 can optionally include a user interface 710, which can be configured to receive input from a human operator and/or provide feedback (e.g., tactile, visual, auditory, etc.) to the human operator regarding operation of the vehicle. For example, the input can comprise motion (e.g., rotation of a steering wheel, manipulation of a joystick, toggle of switch, etc.), audio (e.g., voice commands), or both. In some embodiments, the user interface 710 can be used to control operation of the vehicle or components thereof, for example, via respective modules of control system 706 and/or overriding commands issued by modules of control system 706. In some embodiments, the user interface 710 can be configured as a remote work station for teleoperation of the vehicle.

X. Computer Implementation

Figure 7B:
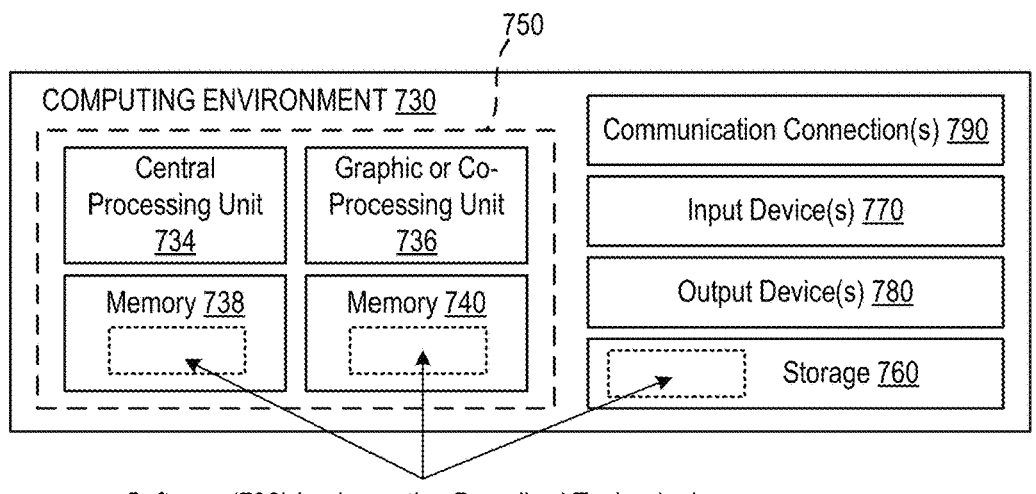
FIG. 7B depicts a generalized example of a computing environment in which the disclosed technologies may be implemented.

FIG. 7B depicts a generalized example of a suitable computing environment 730 in which the described innovations may be implemented, such as aspects of LIDAR sensor 104, LIDAR sensor system 704, controller 408, control system 706, vehicle 100, autonomous vehicle system 700, LIDAR sensing and/or stabilization methods, etc. The computing environment 730 is not intended to suggest any limitation as to scope of use or functionality, as innovations may be implemented in diverse general-purpose or special-purpose computing systems. For example, computing environment 730 can be any of a variety of computing devices (e.g., desktop computer, laptop computer, server computer, tablet computer, etc.).

With reference to FIG. 7B, the computing environment 730 includes one or more processing units 734, 736 and memory 738, 740. In FIG. 7B, this basic configuration 750 is included within a dashed line. The processing units 734, 736 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7B shows a central processing unit 734 as well as a graphics processing unit or co-processing unit 736. The tangible memory 738, 740 may be volatile memory (e.g., registers, cache, RAM), non-volatile memory (e.g., ROM, EEPROM, flash memory, etc.), or some combination of the two, accessible by the processing unit(s). The memory 738, 740 stores software 732 implementing one or more innovations described herein, in the form of computer-executable instructions suitable for execution by the processing unit(s).

A computing system may have additional features. For example, the computing environment 730 includes storage 760, one or more input devices 770, one or more output devices 780, and one or more communication connections 790. An interconnection mechanism (not shown) such as a bus, controller, or network interconnects the components of the computing environment 730. Typically, operating system software (not shown) provides an operating environment for other software executing in the computing environment 730, and coordinates activities of the components of the computing environment 730.

The tangible storage 760 may be removable or non-removable, and includes magnetic disks, magnetic tapes or cassettes, CD-ROMs, DVDs, or any other medium which can be used to store information in a non-transitory way, and which can be accessed within the computing environment 730. The storage 760 can store instructions for the software 732 implementing one or more innovations described herein.

The input device(s) 770 may be a touch input device such as a keyboard, mouse, pen, or trackball, a voice input device, a scanning device, or another device that provides input to the computing environment 730. The output device(s) 770 may be a display, printer, speaker, CD-writer, or another device that provides output from computing environment 730.

The communication connection(s) 790 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Python, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

XI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended points of focus, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as ultra-wideband (UWB) radio, Bluetooth™, Wi-Fi, TDMA, CDMA, 3G, 4G, 4G LTE, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

XII. Conclusion

Although particular LIDAR sensors, components, and configurations have been illustrated in the figures and discussed in detail herein, embodiments of the disclosed subject matter are not limited thereto. Indeed, one of ordinary skill in the art will readily appreciate that different sensors (LIDAR or otherwise), components, or configurations can be selected and/or components removed or added to provide the same effect. In practical implementations, embodiments may include additional components or other variations beyond those illustrated. Accordingly, embodiments of the disclosed subject matter are not limited to the particular sensors, components, and configurations specifically illustrated and described herein.

Any of the features illustrated or described with respect to FIGS. 1-7B can be combined with any other features illustrated or described with respect to FIGS. 1-7B to provide systems, devices, methods, or embodiments not otherwise illustrated or specifically described herein. All features described herein are independent of one another and, except where structurally impossible, can be used in combination with any other feature described herein.

The present disclosure provides, to one of ordinary skill in the art, an enabling description of several embodiments. Some of these embodiments may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure without departing from the scope thereof. Therefore, the above description should not be construed as limiting the disclosure, but merely as embodiments thereof. Those skilled in the art will envision other modifications within the scope of the present disclosure.

The invention claimed is:

1. A system comprising:
an electromagnetic radiation (EMR) detection and ranging (DAR) device, the EMR DAR device comprising a source and a detector, the source being configured to generate EMR having one or more wavelengths, the detector being configured to detect EMR having the one or more wavelengths reflected from one or more features in a surrounding environment;
a shock mount constructed to couple the EMR DAR device to a vehicle and to isolate the EMR DAR device from impulse shocks and/or vibrations experienced by the vehicle;
one or more first inertial measurement units (IMUs) coupled to the EMR DAR device or a first portion of the shock mount, the one or more first IMUs being configured to measure movement of the EMR DAR device; and
a controller operatively coupled to the EMR DAR device and the one or more first IMUs, the controller comprising one or more processors and computer readable storage media storing computer-readable instructions that, when executed by the one or more processors, cause the controller to adjust data of the EMR DAR device indicative of the detected one or more features in the surrounding environment based at least in part on the movement measured by the one or more first IMUs; and
an electromagnetic interference (EMI) shield disposed over or integrated with at least a sensing window of the EMR DAR device;
wherein the EMR DAR device is constructed to direct EMR from the source only through openings of the EMI shield.

2. The system of claim 1, wherein at least one of the one or more first IMUs comprises a gyroscope, an accelerometer, a microelectromechanical system (MEMS), or any combination of the foregoing.

3. The system of claim 1, further comprising one or more second IMUs constructed to be coupled to the vehicle or a second portion of the shock mount, the one or more second IMUs being configured to measure movement of the vehicle.

4. The system of claim 3, wherein at least one of the one or more second IMUs comprises a gyroscope, an accelerometer, a microelectromechanical system (MEMS), or any combination of the foregoing.

5. The system of claim 1, where the EMR DAR device comprises a light DAR (LIDAR) sensor system or a radio DAR (RADAR) sensor system.

6. The system of claim 1, further comprising the vehicle, wherein the vehicle comprises a drive-by-wire kit and is configured as an autonomous vehicle.

7. A system comprising:
an electromagnetic radiation (EMR) detection and ranging (DAR) device, the EMR DAR device comprising a source and a detector, the source being configured to generate EMR having one or more wavelengths, the detector being configured to detect EMR having the one or more wavelengths reflected from one or more features in a surrounding environment, the EMR DAR device being mounted on a vehicle; and
a controller operatively coupled to the EMR DAR device, the controller comprising one or more processors and computer readable storage media storing computer-readable instructions that, when executed by the one or more processors, cause the controller to:
  determine, based on one or more first signals from the EMR DAR device at a first time, a first location of a reference feature of the vehicle;
  determine, based on one or more second signals from the EMR DAR device at a second time, a second location of the reference feature of the vehicle;
  calculate movement of the EMR DAR device relative to the vehicle based at least in part on the determined first and second locations; and
  adjust data of the EMR DAR device indicative of the detected one or more features in the surrounding environment based at least in part on the calculated movement; and
an electromagnetic interference (EMI) shield disposed over or integrated with at least a sensing window of the EMR DAR device;
wherein the EMR DAR device is constructed to direct EMR from the source only through openings of the EMI shield.

8. The system of claim 7, where the EMR DAR device comprises a light DAR (LIDAR) sensor system or a radio DAR (RADAR) sensor system.

9. The system of claim 7, further comprising the vehicle, wherein the vehicle comprises a drive-by-wire kit and is configured as an autonomous vehicle.

10. The system of claim 7 further including:
  a shock mount constructed to couple the EMR DAR device to the vehicle and to isolate the EMR DAR device from impulse shocks and/or vibrations experienced by the vehicle.

11. The system of claim 10 further including:
  one or more first inertial measurement units (IMUs) coupled to the EMR DAR device or a first portion of the shock mount, the one or more first IMUs being configured to measure movement of the EMR DAR device.

12. The system of claim 11, wherein at least one of the one or more first IMUs comprises a gyroscope, an accelerometer, a microelectromechanical system (MEMS), or any combination of the foregoing.

13. The system of claim 12, further comprising one or more second IMUs constructed to be coupled to the vehicle or a second portion of the shock mount, the one or more second IMUs being configured to measure movement of the vehicle.

14. The system of claim 13, wherein at least one of the one or more second IMUs comprises a gyroscope, an accelerometer, a microelectromechanical system (MEMS), or any combination of the foregoing.

* * * * *